United States Patent

Mercuri et al.

(10) Patent No.: US 6,433,067 B2
(45) Date of Patent: Aug. 13, 2002

(54) FORMABLE FLEXIBLE GRAPHITE SEALING COMPOSITES

(75) Inventors: Robert Angelo Mercuri, Seven Hills; Michael Lee Warddrip, Parma; Thomas William Weber, Cleveland, all of OH (US)

(73) Assignee: Graftech Inc., Wilmington, DE (US)

( * ) Notice: Subject to any disclaimer, the term of this patent is extended or adjusted under 35 U.S.C. 154(b) by 0 days.

(21) Appl. No.: 09/775,471

(22) Filed: Feb. 5, 2001

Related U.S. Application Data

(63) Continuation of application No. 09/088,850, filed on Jun. 2, 1998, now abandoned.

(51) Int. Cl.⁷ .............................. C08J 3/00; C08K 3/04; C08L 75/00
(52) U.S. Cl. ........................................ 524/495; 524/496
(58) Field of Search .................................. 524/495, 496

(56) References Cited

U.S. PATENT DOCUMENTS

| | | | |
|---|---|---|---|
| 3,404,061 A | 10/1968 | Shane et al. | 161/125 |
| 4,190,257 A | 2/1980 | Schnitzler | 277/102 |
| 4,226,821 A | 10/1980 | Ishikawa et al. | 264/134 |
| 4,642,201 A | 2/1987 | Vogel | 252/503 |
| 4,826,181 A | 5/1989 | Howard | 277/112 |
| 4,895,713 A | 1/1990 | Greinke et al. | 423/448 |
| 4,911,972 A | 3/1990 | Mercuri | 428/99 |
| 4,988,583 A | 1/1991 | Watkins et al. | 429/30 |
| 5,108,849 A | 4/1992 | Watkins et al. | 429/30 |
| 5,176,863 A | 1/1993 | Howard | 264/113 |
| 5,225,262 A | 7/1993 | Leduc | 428/75 |
| 5,225,379 A | 7/1993 | Howard | 501/99 |
| 5,228,701 A | 7/1993 | Greinke et al. | 277/102 |
| 5,300,370 A | 4/1994 | Washington et al. | 429/34 |
| 5,494,506 A | 2/1996 | Ford et al. | 55/502 |
| 5,531,454 A | 7/1996 | Borneby | 277/96 |
| 5,683,778 A | 11/1997 | Crosier | 428/59 |
| 5,902,762 A | * 5/1999 | Mercuri et al. | |

FOREIGN PATENT DOCUMENTS

| | | |
|---|---|---|
| EP | 0879870 | 5/1998 |
| JP | 54088911 | 7/1979 |
| JP | 63157747 | 6/1988 |
| JP | 63242395 | 10/1988 |
| JP | 1123991 | 5/1989 |
| JP | 8143856 | 6/1996 |
| JP | 8169478 | 7/1996 |

OTHER PUBLICATIONS

WO 95/16287, David P. Wilkinson et al, Embossed Fluid Flow Field Plate For Electrochemical Fuel Cells, Publication Date Jun. 15, 1995.
WO 99/67188, Robert Angelo Mercuri et al, Formable Flexible Graphite Sealing Composites, Publication Date Dec. 29, 1999.

* cited by examiner

*Primary Examiner*—Patrick D. Niland
(74) *Attorney, Agent, or Firm*—Waddey & Patterson; Lucian Wayne Beavers

(57) ABSTRACT

Formable mixture of flexible graphite sheet particles having embedded ceramic fibers extending into the particles from the particle surfaces to increase the permeability of the sheet to resin.

8 Claims, 5 Drawing Sheets

FORMABLE FLEXIBLE GRAPHITE SEALING COMPOSITES

This is a continuation of prior application Ser. No. 09/088,850 filed Jun. 2, 1998 now abandoned.

FIELD OF THE INVENTION

The present invention relates to a mixture of liquid resin and finely divided particles of a composite material of flexible graphite sheet and needle-shaped ceramic particles which can be used to form, by molding or extrusion, gaskets and other components with a high degree of imperviousness to liquids and gases.

BACKGROUND OF THE INVENTION

The term "flexible graphite" as used herein represents the exfoliated reaction product of rapidly heated natural graphite particles which have been treated with an agent that intercalates into the crystal-structure of the graphite to expand the intercalated particles at least 80 or more times in the direction perpendicular to the carbon layers in the crystal structure. Flexible graphite and the making thereof is described in U.S. Pat. No. 3,404,061 Shane et al. Expanded, i.e. exfoliated graphite may be compressed into thin sheets (hereinafter referred as flexible graphite "foil") with a density approaching theoretical density, although a density of about 50 to 85 lbs./ft.$^3$ is suitable for most applications, including compression into shapes suitable as seal rings in engine exhaust and other applications.

A common method for making expandable graphite particles, described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. A preferred intercalating agent is a solution of a mixture of sulfiric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent. After the flakes are intercalated excess solution is drained from the flakes and after washing with water, the intercalated graphite flakes are dried and are expandable upon exposure to a flame for only a few seconds. The thus treated particles of graphite are hereafter referred to as "particles of intercalated graphite". Upon exposure to high temperature, the particles of intercalated graphite expand in dimension as much as 80 to 1000 or more times its original volume in an accordion-like fashion in the c-direction, i.e. in the direction perpendicular to the crystalline planes of the constituent graphite particles. The exfoliated graphite particles are vermiform in appearance, and are therefore commonly referred to as worms. The worms may be compressed together into flexible sheets which, unlike the original graphite flakes, can be formed and cut into various shapes.

Flexible graphite foil is coherent, with good handling strength, and flexible graphite foil can be wound into rolls and can also be wrapped around metal fixtures such as mandrels, possesses desirable heat transfer properties and is, accordingly, particularly useful for high temperature applications such as engine exhaust seal ring applications. It has been proposed to increase the sealability of flexible graphite sheet or foil by impregnating the same with resin. However, the surface layers of flexible graphite sheet or foil, due to the alignment of exfoliated graphite particles and the constituent layers of atoms parallel to the surface of the flexible sheet or foil, resist resin impregnation when the sheet or foil is immersed in liquid resin. However, due to the well known anisotropy of flexible graphite, resin will flow readily within the flexible graphite sheet in directions parallel to the opposed parallel planar surfaces of the sheet or foil and the planes of the constituent graphite particles of the sheet, i.e. transverse to the "c axis" direction of the graphite particles if penetration into the flexible graphite sheet can first be achieved.

It is an object of the present invention to provide a sealing composition comprising finely divided particles of flexible graphite sheet, or foil, of increased permeability to increased resin impregnation in admixture with liquid resin.

SUMMARY OF THE INVENTION

Figure 1:
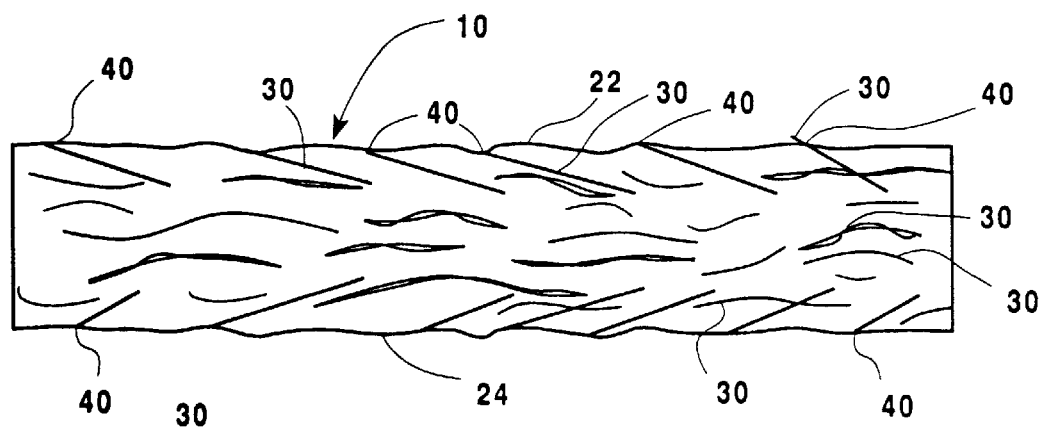
FIG. 1 shows, in an enlarged cross-section sketch of a sheet of flexible graphite (original thickness of 0.01 inch) containing ceramic fibers in accordance with the present invention.

The present invention relates to a moldable and extrudable mixture of resin with finely divided particles of a composite material of a flexible graphite sheet having opposed parallel, planar outer surfaces and needle-shaped ceramic fiber particles which are embedded in the flexible sheet and which extend from interior the flexible sheet to at least one of the planar outer surfaces of the flexible graphite sheet.

DETAILED DESCRIPTION

In the practice of a particular embodiment of the present invention, intercalated natural graphite flakes are mixed and blended with from about 1.5 to 60% by weight of needle-shaped ceramic fiber particles having a length of 0.15 to 1.5 millimeters. The width of the particles should be from 0.04 to 0.004 mm. The ceramic fiber particles are nonreactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The mixture of intercalated natural graphite flake and needle-shaped ceramic fiber particles, in which the graphite flake and ceramic fiber particles are in general alignment, is exposed to a flame at a temperature up to 2500° F. to exfoliate, i.e. expand the intercalated graphite flake into expanded graphite particles from 80 to 1000 times the volume of the unexpanded intercalated natural graphite flake which surround and entrap the needle-shaped ceramic fiber particles. Due to the expansion, the ceramic fiber particles are no longer in substantial alignment with the graphite particles but are randomly positioned in the mixture of exfoliated graphite and ceramic fiber. The mixture of exfoliated graphite particles and randomly oriented needle-shaped ceramic fiber particles is roll-pressed into sheet or foil typically 0.1 to 3.5 mm thick. The resultant sheet, or foil, is characterized by having needle-shaped particles extending from interior of the flexible graphite sheet to and through at least one of the opposed planar surfaces of the flexible graphite sheet. Since the needle-shaped ceramic fiber particles are non-reactive and non-adhering to the graphite in the flexible sheet, a plurality of annular channels surrounding the respective needle-shaped particles is provided in the flexible graphite sheet extending from the opposed surfaces of the sheet into the body of the sheet. The flexible graphite sheet is finely divided, e.g. by a combination of slicing into ribbon-like sheets and then hammer milling to a size range of about from 10 to 80 mesh. The resulting sheet particles, which have channels in the individual particle as described above, are mixed with liquid resin, e.g. by immersion, therein, and receive the resin which then infiltrates the flexible graphite sheet particles into the channels and also the particle edges to result in a relatively dry appearing particles containing 10 to 60% wt. % resin. The ceramic fiber particles remain stable during all steps of the processing treatment so that the channels are not blocked by melted fiber or fiber decomposition products. The resulting doughy mass is formable by molding or extrusion into shapes suitable as sealing elements such as gaskets, and also into components designed for gas and liquid impermeable use such as grammets, high performance sealing gaskets, fuel cell flow field plates. After curing of the resin, within the graphite sheet particles, the sealability of the molded or extruded element is enhanced. In a preferred embodiment, resin-containing flexible graphite sheet is particulated.

FIG. 1 is a drawing sketch based on microscope observations of 0.01 inch thick sheets of flexible graphite which shows a flexible graphite sheet 10, in cross-section, with parallel opposed planar surfaces 22, 24. Embedded ceramic fiber particles are shown at 30. Penetration of sheet 10 by ceramic fibers 30 is illustrated at 40.

EXAMPLE I

Natural graphite flake, sized 80% by weight held on 50 mesh was treated in a mixture of 90 wt. % sulfuiric acid and 10 wt. % nitric acid. The thus treated intercalated graphite flake was water washed and dried to about 1% by weight water. One (1) pound of this intercalated flake was mixed with 0.15 pounds of needle-shaped ceramic fiber of commercially available calcium metasilicate sized mostly with a 15 to 25 l/w aspect ratio. The mixture of intercalated graphite and calcium metasilicate fiber was introduced into a furnace of 2500° F. to obtain rapid expansion of the intercalated graphite flake into vermicular worm-shaped particles having a volume of about 325 times that of the unexpanded intercalated flake. The expanded worm-shaped particles surrounded the admixed calcium metasilicate fibers and the mixture was rolled into a flexible graphite sheet 0.01 inch thick and 24 inches wide in which admixed calcium metasilicate fibers extended from a surface of the sheet into the body of the sheet which contained about 12% by weight of the calcium metasilicate fiber.

Figure 2:
FIGS. 2 through 6 are electron microscope views (original magnification 100×) at increasing electron beam intensity voltages (2.5 KV to 40 KV) of a portion of a planar surface of a flexible graphite sheet containing ceramic fibers in accordance with the present invention.
Figure 3:
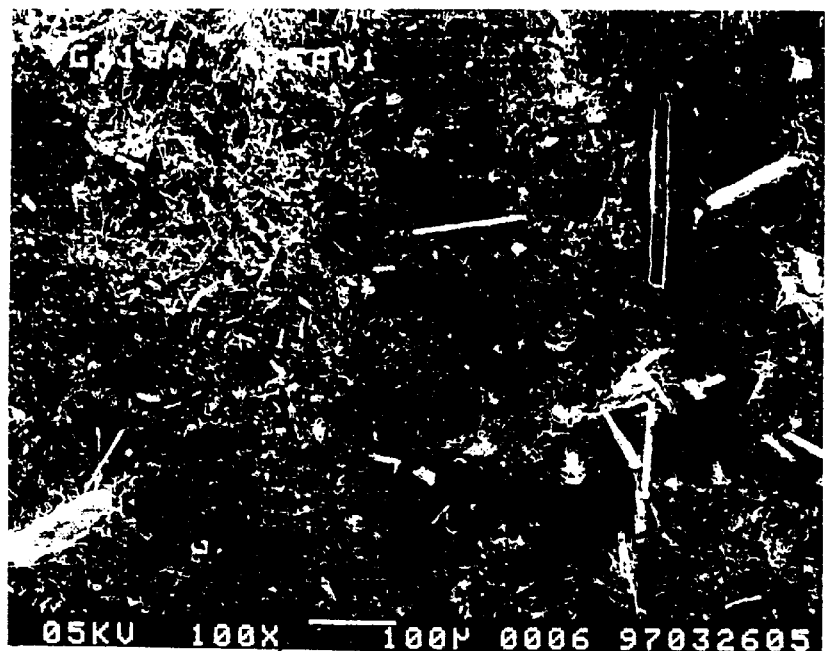
Figure 4:
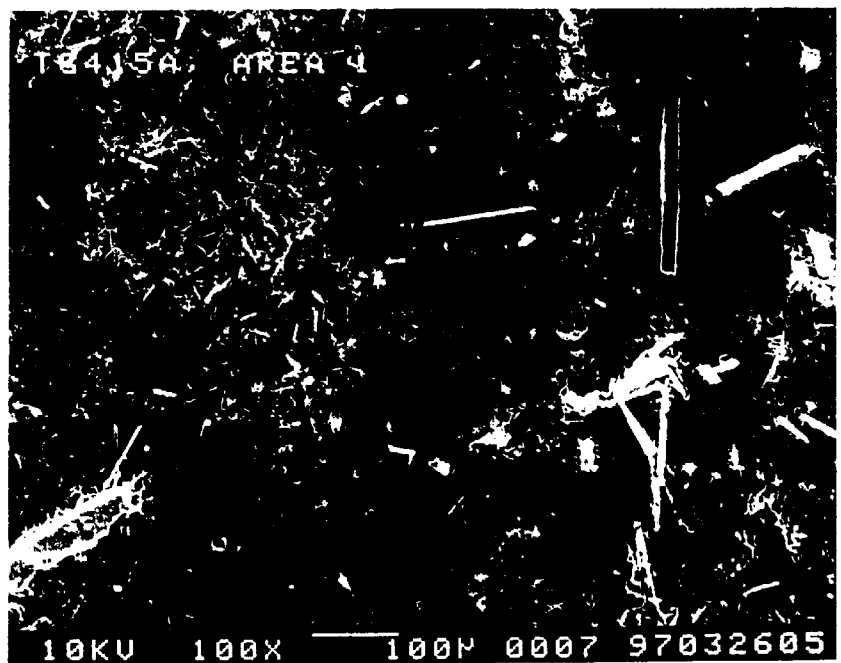
Figure 5:
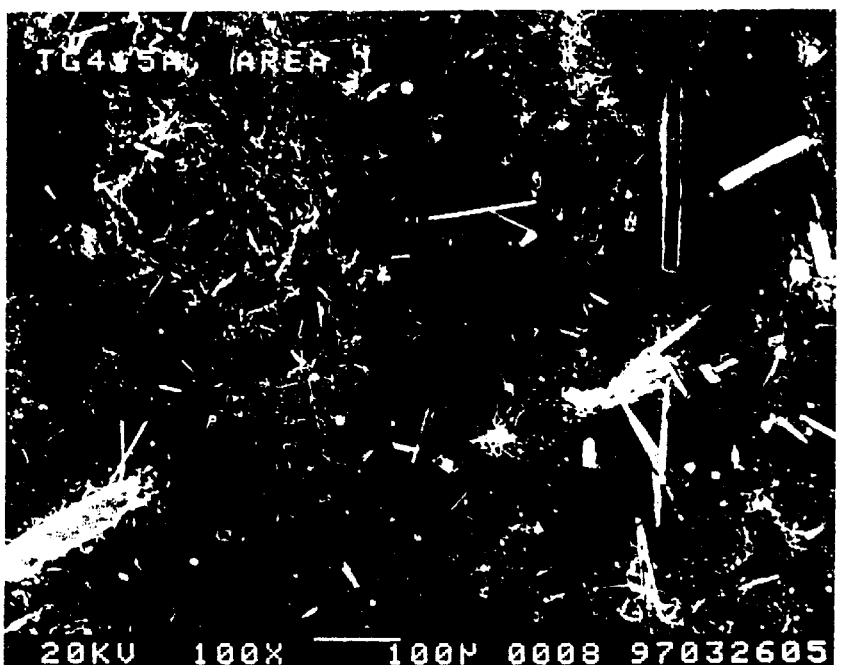
Figure 6:
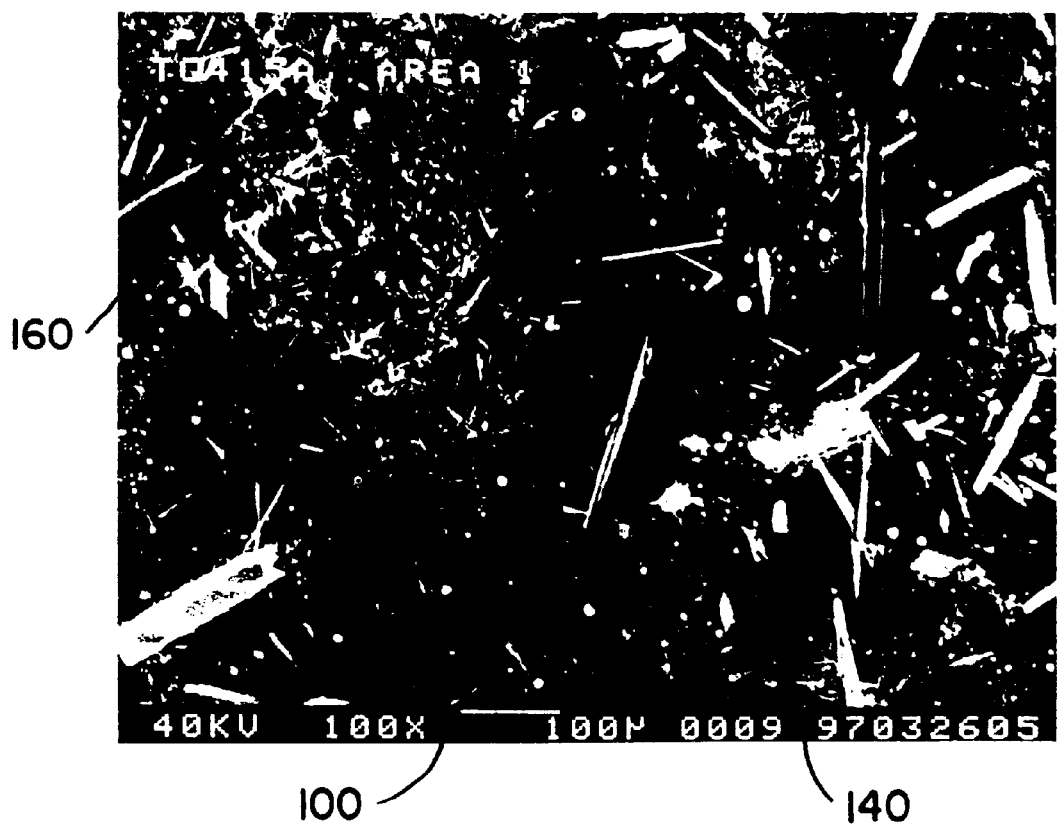

The electron microscope view of FIG. 2 (100x—see 100 micron scale) shows the upper portion of a ceramic fiber 100 which penetrates a planar surface 22 of a flexible graphite sheet. FIGS. 3 to 6, at increasing voltages, look "deeper" into the flexible graphite sheet and show the penetration of ceramic fiber 100 into the flexible graphite sheet. Ceramic fibers embedded in the flexible graphite sheet below surface 72 are shown at 140, 160.

EXAMPLE II

A sample of the sheet of Example I, 8 inches wide was immersed in and pulled through a solution of resin 10% phenolic resin with acetone diluent at a rate of 10 feet per minute. After immersion and drying, the sample showed an increase in weight of 18.7%.

The sample was further treated by heating to 23° C. to stabilize the resin and the sheet was calendered between pressure rolls to a density of 1.5 gms/cc and then comminuted to finely divided particles sized in the range of 10 to 80 mesh by slicing and hammer milling to provide a formable mixture.

Figure 7:
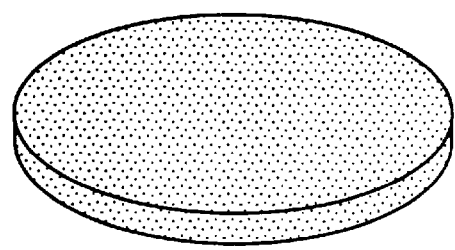
FIGS. 7, 7A show typical shapes which can be formed from the sealing material of the present invention.
Figure 7A:
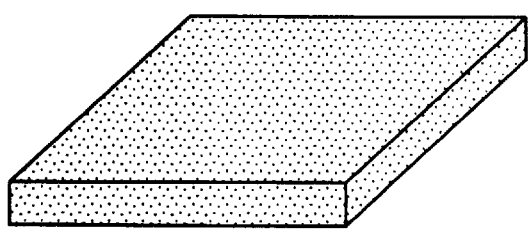

The formable mixture of the present invention can be shaped as discs or plates as shown in FIGS. 7, 7A and, after being heat cured, can be used as gas and liquid impermeable sealing components.

Figure 8:
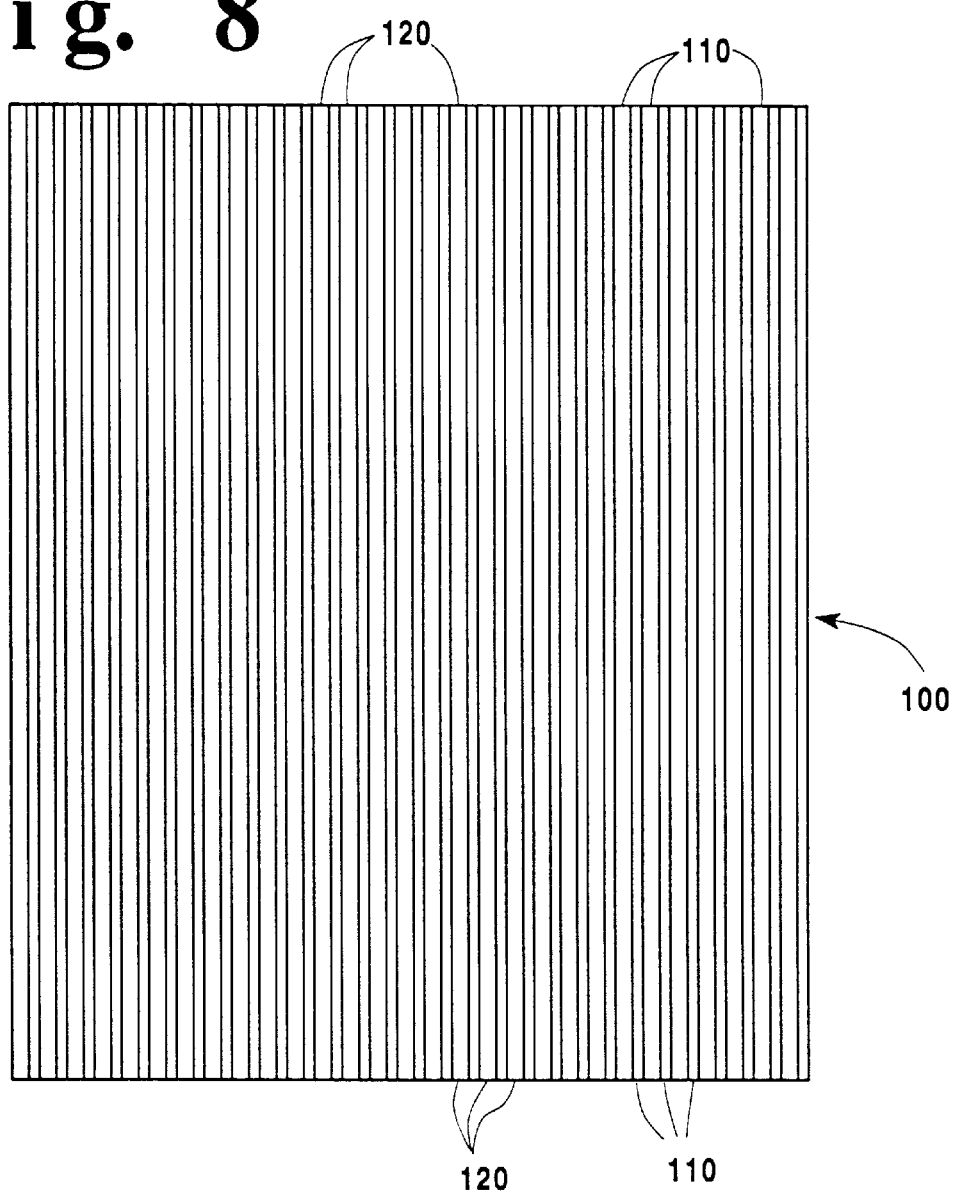
FIGS. 8, 8A show a portion of a sheet of flexible graphite containing ceramic fibers which has been mechanically deformed into a grooved plate for use as a flow field plate in an electrochemical fuel cell.
Figure 8A:
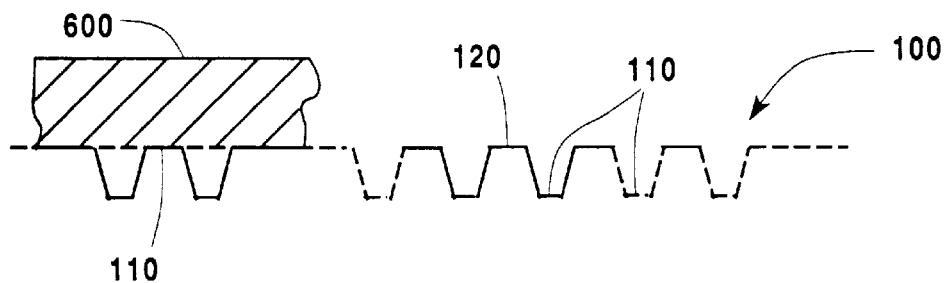

A component of the type shown in FIG. 8 was formed by stamping an extruded plate formed from the formable mixture into a shape as shown in the top and side views of FIGS. 8, 8A, which shape is useful as a fluid flow plate for a fuel cell. The plate 100 has multiple grooves separated by walls 120. The grooves 110 are typically 1.5 mm deep and 1–1.5 mm wide and extend to cover the electrode of the fuel cell. The walls 120 are typically 1.1–5 mm inch thick. With suitably designed molds, the plate 100 could be formed directly from the formable mixture.

What is claimed is:

1. A formable mixture which comprises a mixture of (a) particles formed from flexible graphite sheet having ceramic fibers mixed therein, and (b) liquid resin.

2. The mixture of claim 1 wherein the flexible graphite sheet having ceramic fibers mixed therein is formed by compressing a mixture of exfoliated graphite particles and ceramic fibers.

3. The mixture of claim 1 wherein the flexible graphite sheet is 0.1 to 3.5 millimeters in thickness.

4. The mixture of claim 3 wherein the particles formed from the flexible graphite sheet have a size range of from about 10 to about 80 mesh.

5. The mixture of claim 1 wherein the ceramic fibers are non-reactive and non-adhering to graphite and are stable at temperatures of up to 2000° F.

6. The mixture of claim 5 wherein the ceramic fibers are formed of macerated quartz glass fibers, carbon fibers, graphite fibers, zirconia fibers, boron nitride fibers, silicon carbide fibers, magnesia fibers, naturally occurring mineral fibers, calcium aluminum silicate fibers, aluminum oxide fibers, or mixtures thereof.

7. The mixture of claim 1 wherein the mixture is formed by immersing the particles formed from flexible graphite sheet having ceramic fibers mixed therein the liquid resin so as to infiltrate the channels formed in the particles formed from flexible graphite sheet.

8. The mixture of claim 1 wherein the mixture comprises from 10% to 60% by weight resin.

* * * * *

UNITED STATES PATENT AND TRADEMARK OFFICE
CERTIFICATE OF CORRECTION

PATENT NO.   : 6,433,067 B2
DATED        : August 13, 2002
INVENTOR(S)  : Mercuri et al.

It is certified that error appears in the above-identified patent and that said Letters Patent is hereby corrected as shown below:

Column 4,
Line 24, "...heating to 23°C. to" should read as -- ...heating to 235°C. to --

Signed and Sealed this

Fourth Day of February, 2003

JAMES E. ROGAN
*Director of the United States Patent and Trademark Office*